Figure 1:
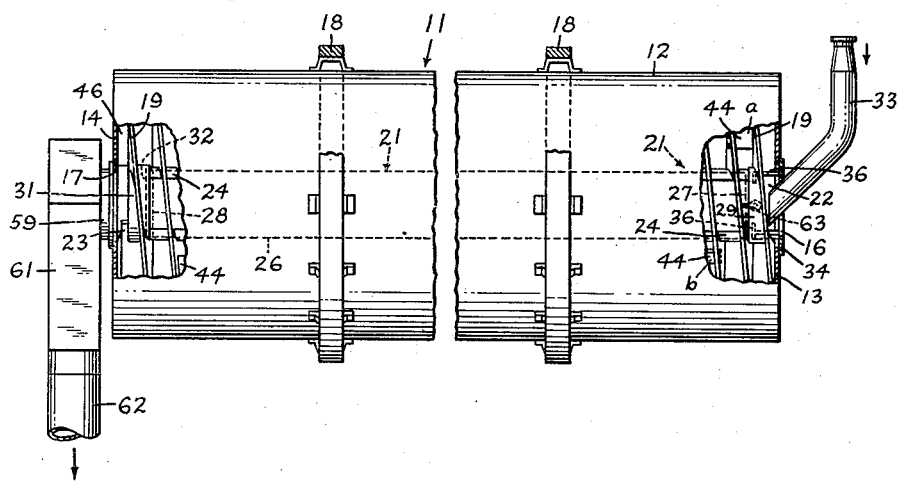

INVENTORS.
WILLIAM H. BRADSHAW
ROBERT R. JAMES
EDWARD H. SHAW
BY
ATTORNEYS.

INVENTORS.
WILLIAM H. BRADSHAW
ROBERT R. JAMES
EDWARD H. SHAW
BY
ATTORNEYS.

July 4, 1961 W. H. BRADSHAW ET AL 2,991,281
SLURRY AGING

Filed Jan. 13, 1954 3 Sheets-Sheet 3

INVENTORS.
WILLIAM H. BRADSHAW
ROBERT R. JAMES
EDWARD H. SHAW
BY
ATTORNEYS.

United States Patent Office 2,991,281
Patented July 4, 1961

2,991,281
SLURRY AGING
William H. Bradshaw, New Rochelle, N.Y., Robert R. James, Charlotte, N.C., and Edward H. Shaw, Rome, Ga., assignors to Celanese Corporation of America, New York, N.Y., a corporation of Delaware
Filed Jan. 13, 1954, Ser. No. 403,788
18 Claims. (Cl. 260—233)

This invention relates to the treatment of liquids and relates more particularly to the aging of alkali cellulose.

In the manufacture of viscose it is customary to steep sheets of cellulose pulp in an aqueous caustic solution in order to form alkali cellulose and remove hemicellulose and other impurities from the pulp. Following the steeping operation the pulp is pressed to remove excess caustic solution, and the pressed pulp is mechanically disintegrated or shredded to form a mass of fibers resembling bread crumbs. These alkali cellulose crumbs are placed in a covered container and allowed to age, usually for 1 to 3 days. During the aging step absorption of oxygen occurs and the degree of polymerization of the alkali cellulose decreases. The aged alkali cellulose is then xanthated, i.e. reacted with carbon disulfide to form sodium cellulose xanthate, and dissolved in aqueous caustic to form viscose.

It is an object of this invention to provide a novel process for the production of aged alkali cellulose in a rapid and efficient manner.

Another object of this invention is the provision of a novel apparatus for the continuous aging of alkali cellulose, which apparatus will be economical in construction and efficient in operation.

Still another object of this invention is to provide a novel apparatus for the continuous treatment of liquids, which apparatus will not require any stuffing boxes or other elaborate sealing means.

Other objects of this invention will be apparent from the following detailed description and claims.

According to this invention the alkali cellulose is aged continuously while it is in the form of a slurry in aqueous alkali. More particularly, bubbles of an oxygen-containing gas are continuously dispersed in the slurry of alkali cellulose and the resulting continuous stream of gasified slurry is divided into relatively small batches, which small batches are moved continuously and successively through an aging zone while each batch is maintained substantially separate from the succeeding batch.

In one embodiment of this invention, the gasified slurry of alkali cellulose is passed, directly after it has been formed, through a rotating aging tank comprising a horizontal cylindrical shell and central core. The slurry is moved from the inlet end of the tank to the outlet end, through the annular space between the core and the shell, by the action of a spiral vane which runs the entire length of the tank and extends between the core and the shell, there being advantageously a relatively large number of convolutions (e.g. 10 or more, preferably about 40) of the spiral vane within the shell. The vane is fixed to, and rotates with, the other parts of the tank, i.e. the core and shell. Accordingly, the rate of movement of the slurry through the tank and the level of the slurry therein can be regulated by varying the rate of rotation of the tank. In operation, the tank is rotated at such a rate that the level of the slurry never rises above the top of the core, so that none of the slurry can flow over the top of the core. Accordingly, the aerated slurry, which is supplied to the tank as a continuous stream, moves through the tank between the convolutions of the spiral vane in the form of separate successive batches, there being substantially no intermingling of said batches in the tank during their progress therethrough.

The duration of the aging period is determined by the number of convolutions of the vane and the rate of rotation of the aging tank and may be varied readily by changing said rate of rotation. Thus, when there are 40 convolutions of the vane and the tank is rotated at 1⅓ revolutions per minute, the slurry will be retained in the aging tank for a period of about 30 minutes, which is a desirable aging period for the preferred gasified slurries.

It will be apparent that, because of the relatively large number of convolutions of the vane, there will be a correspondingly large number of separate batches of the slurry in the tank at any one time and that each such batch will consist of the amount of slurry which has flowed into the tank over a relatively short period of time, as compared with the total aging time. For example, under the conditions mentioned above, i.e. rotation of a tank containing 40 convolutions at a rate of 1⅓ revolutions per minute, each separate batch will consist of the amount of slurry which has flowed into the tank in a period of about ¾ minute. Accordingly, within any given separate batch of slurry, the variation in residence time in the tank will be only about ¾ minute in a total of 30 minutes. Since all portions of each separate batch will be aged for substantially the same period of time during their passage through the tank, the range of variation of the degree of polymerization of the alkali cellulose in said batch will be relatively small, even though there is thorough mixing of the slurry within each batch.

In one form of the apparatus the batches are discharged gradually and successively from the tank. In this form, the interval of time for discharging each batch is about the same as the interval of time for filling each batch, e.g. about ¾ minute under the conditions set out above. Thus, that portion of each uniformly mixed batch of slurry which is discharged last will be retained in the tank for a slightly longer period than that portion of the slurry which is discharged first and there will therefore be a slight cyclical variation in the average degree of polymerization of the alkali cellulose in the slurry discharged from the tank. However, this variation is very much less than that obtained in conventional processes for aging alkali cellulose. Thus, since all of the successive separate batches remain in the aging tank for identical periods of time, the alkali cellulose emerging from said tank throughout the continuous process will have a substantially contant average degree of polymerization, except for the aforesaid slight cyclical variation, and a substantially constant small range of distribution of degree of polymerization.

Advantageously, the gasified slurry which is fed to the aging tank is prepared in the manner disclosed in the copending application of Bradshaw, Trammell, Allen, Lynch and Shaw, S. No. 403,906, and the copending application of Bradshaw, Lynch and Shaw, S. No. 403,907, both filed on even date herewith. Thus, cellulose pulp is mixed with an aqueous solution of caustic soda and with a small amount of an emulsifying agent to form a slurry, which slurry is then mixed with an oxygen-containing gas, such as air or oxygen, and subjected to violent agitation to form a uniform dispersion of small bubbles of the gas in the slurry. Desirably, the caustic soda solution has a concentration of about 7% to 30%, preferably about 18½, and the amount of pulp added is sufficient to yield a slurry containing about 2% to 6% of cellulose, preferably about 3% to 5%. The emulsifying agent is advantageously a sodium salt of sulfated oleic acid, such as is sold under the name "Prestabit Oil V–New," and is used in amount of about ⅛% to 2%, preferably about ½%, based on the weight of the cellulose. The violent agitation is desirably carried out in a confined zone in which the mixture of slurry and gas is urged outwardly by centrifugal force against an uneven solid surface, for example in a disc refiner such as a Bauer mill. The resulting gasified slurry contains numerous small bubbles of gas, the majority of the bubbles being less than 120 microns in diameter, with the average size being about 30 to 60 microns. Desirably, the slurry is at an elevated temperature of about 45 to 75° C., preferably about 65° C., and is maintained at this temperature during its passage through the aging tank.

There is some tendency for the gasified slurry to separate on standing, the gasified alkali cellulose fibers tending to rise to the top of the slurry. To prevent such separation and to cause those of the small bubbles of gas which have coalesced to a larger size to leave the mass of slurry the apparatus of this invention is advantageously provided with means, such as baffles mounted between convolutions of the spiral vane, for mildly agitating the gasified slurry within each batch as it passes through the tank.

Figure 2:
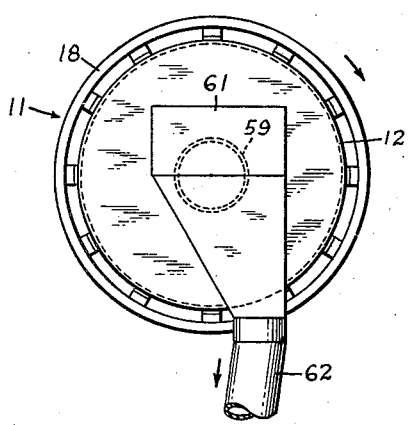
Figure 5:
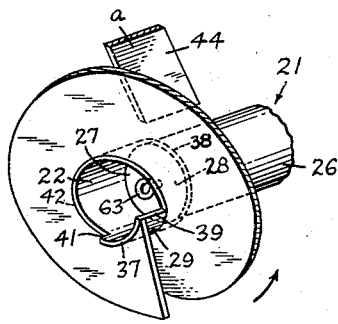
Figure 6:
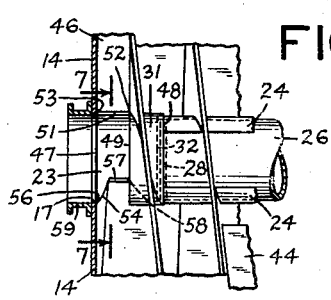
Figure 7:
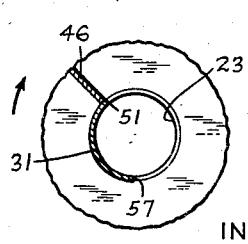
Figure 3:
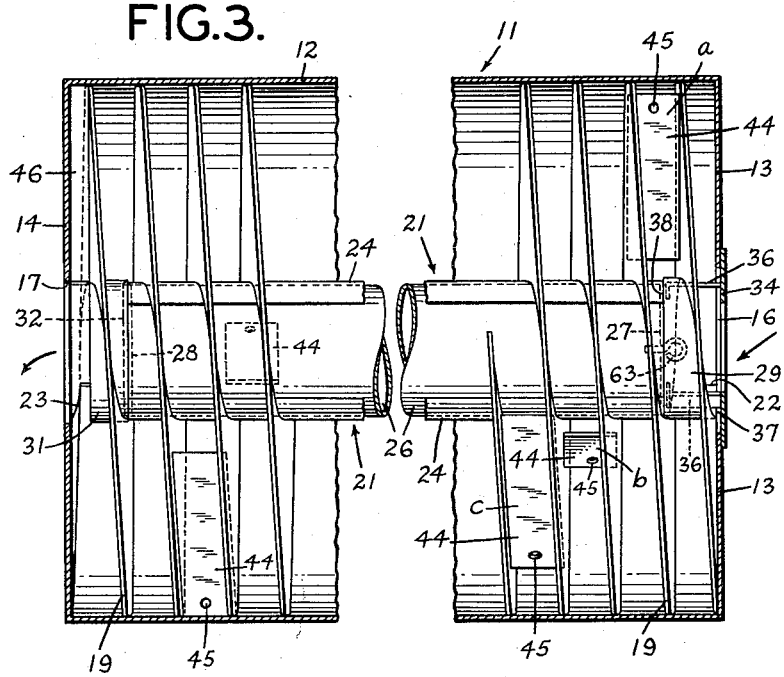
Figure 4:
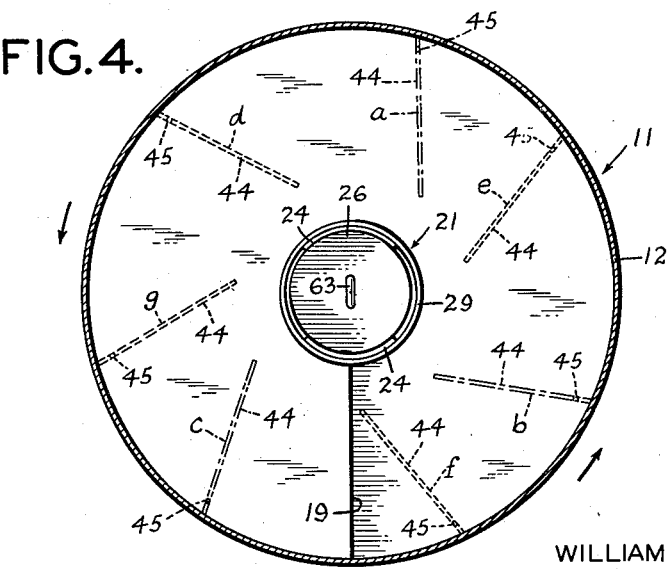

One form of the apparatus of this invention is illustrated in the accompanying drawings, in which FIG. 1 shows a side view of the apparatus of this invention, with parts broken away, FIG. 2 is an end view taken from the discharge end of the apparatus, FIG. 3 is an enlarged view of the interior of the tank, showing the shell, core, spiral vane and baffles, FIG. 4 is an end view of the interior of the tank, taken from the inlet end, showing the arrangement of the baffles, FIG. 5 is a perspective view of portions of the spiral vane, core and baffles at the inlet end of the tank, showing the shape of a delivery slot in the core, FIG. 6 is an enlarged view of the interior of the discharge end of the tank, FIG. 7 is a cross-sectional view taken along the line 7—7 of FIG. 6, but with the parts in another position.

Figure 8:
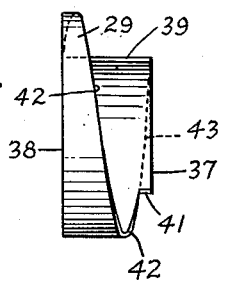
Figure 9:
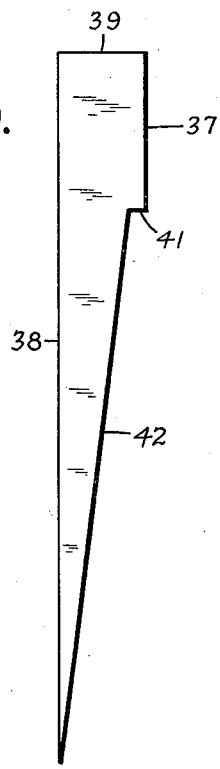
Figures 10, 11:
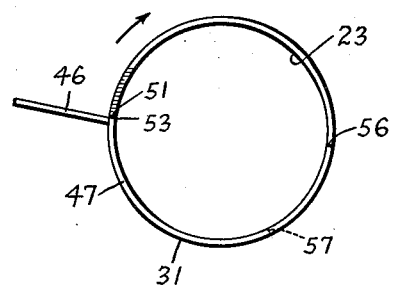
Figure 12:
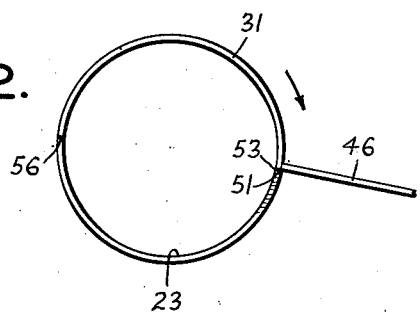

FIG. 8 is a side view of the delivery member, whose outline defines, in part, the shape of the delivery slot, FIG. 9 is a developed view of the delivery member, FIG. 10 is a side view of a discharge member, and FIGS. 11 and 12 are end views of the discharge member taken at different times during the rotation of the tank.

Referring now to the drawings, reference numeral 11 indicates a tank comprising a cylindrical shell 12 having end plates 13 and 14 provided with inlet and outlet apertures 16 and 17, respectively. The shell 12 is mounted, for rotation about its long horizontal axis, in any suitable manner, for example by means of rollers (not shown) engaging tires 18 circumferentially disposed about said shell. It is desirable to provide insulation, not shown, around the periphery of the shell 12 to prevent loss of heat from the contents of said shell. Within the shell 12 there is a single helical, or spiral-shaped vane 19 whose outer diameter is substantially equal to the inner diameter of the shell. The vane 19 is preferably formed of sheet metal and is fixed to the shell 12 in any suitable manner, as by welding the outer edge of the vane continuously along its helical junction with the inner surface of the shell.

The vane 19 is disposed about a cylindrical hollow core 21 extending the length of the shell 12, while the ends of the vane abut against and are welded to the end plates 13 and 14 of said shell along lines extending radially on said end plates. At its ends the core 21 is provided with specially shaped delivery and discharge slots 22 and 23, respectively, for the passage of slurry to and from the interior of the shell 12, and the portion of the core between these slots is substantially sealed off from said slots and from the remainder of the shell. The vane 19 and the core 21 are so connected to the shell 12 and to each other that during operation the vane, core and shell will rotate together as a unit.

The core 21 is built up of several elements. Thus, there are a pair of long relatively thin opposed arcuate plates 24 (see FIGS. 3 and 4) joined, as by welding, to the inner, and generally helical, edge of the vane 19. Removably mounted between these plates, with a relatively tight sliding fit, is a long cylindrical tube 26 having both of its ends 27 and 28 closed. Adjacent to the inlet end of the tank 11 there is provided a specially shaped delivery member 29 (see also FIG. 8) defining the delivery slot 22, which delivery member is welded or otherwise joined to the plates 24 and extends to the end plate 13 of the shell 12. At the other end of the tank 11 there is a specially shaped discharge member 31 (see also FIG. 10) welded or otherwise joined to the plates 24 and extending to the end plate 14 of the shell 12. At the point where the discharge member 31 joins the arcuate plates 24 there is provided a circular sealing plate 32 welded to the inner circumference of said discharge member.

An aerated slurry of alkali cellulose is supplied directly to the inlet end of the shell 12, from a suitable aerating device (not shown), through a stationary pipe 33 (FIG. 1), which pipe passes through the inlet aperture 16 and through the central opening of an annular guard plate 34 bolted to the end plate 13 of said shell. The guard plate is provided with spaced fingers 36 projecting horizontally into the interior of the shell almost into contact with the end 28 of the tube 26 in order to insure that the tube 26 remains in the desired position. A continuous stream of slurry falls from the end of the pipe 33, through the delivery slot 22, and into the annular space between the end plate 13 and the first convolution of the vane 19. Due to the rotation of shell 12, vane 19 and core 21, the slurry is moved through the shell from the inlet end to the discharge end thereof. However, the rate of feed of the slurry and the rate of rotation of the shell 12 are so correlated that the level of the slurry in the shell does not rise above the top of the core 21. Accordingly, the spaces between convolutions of the vane 19 act as separate compartments and the aerated slurry, which is fed through the pipe 33 continuously, passes through the shell 12 in the form of separate successive batches.

The delivery slot 22, defined by the delivery member 29, is of such shape and size as to divide the continuous stream of slurry emerging from the pipe 33 smoothly and efficiently into a series of separate batches of equal size. More particularly, the delivery member 29 (see FIG. 8) has a front edge 37 located in a vertical plane and adapted to abut against and be welded to the end plate 13 of the shell, and a rear edge 38, located in a vertical plane and adapted to be welded to the guide plates 24 of the core 21. The front and rear edges 37 and 38 are both arcuate (though they appear as straight lines in the developed view shown in FIG. 9), the front edge 37 covering an arc of about 60° and the rear edge 38 constituting a complete circle. The arcs of both of said edges 37 and 38 have the same radius, which radius is slightly larger than the radius of the long cylindrical tube 26. The delivery member 29 also has a horizontal straight edge 39 joining its front and rear edges 37 and 38 and another shorter horizontal edge 41 leading from its front edge 37 to a helical edge 42. Along this helical edge 42 the vane 19 is joined to the delivery member 29, the pitch of said helical edge being the same as the pitch of said vane. The vane 19 is also joined to the delivery member along a helical line 43 (shown in dots in FIG. 8) running from the end of the helical edge 42 to the intersection of the front edge 37 and the longer horizontal edge 39.

The operation of the delivery member 29 may be understood from a consideration of the sequence of events starting when the parts are in the position shown in FIG. 5. At this point the slurry flowing continuously at a constant rate from the pipe 33 (FIG. 1) falls onto the delivery member and runs off over the short horizontal edge 41 (FIG. 5) and the helical edge 42 into the space between the end plate 13 of the shell (FIGS. 1 and 3) and the forward surface of the leading portion, or beginning of the first convolution, of the vane 19. As the whole assembly rotates, the slurry continues to fall past the helical edge 42 further and further towards the rear of the delivery member 29 until the longer horizontal edge 39 moves under the outlet of pipe 33 and intercepts the stream of slurry. At this point the body of slurry which has flowed into the shell 12 has been engaged by the rear surface of the leading portion of the vane 19. This body, or batch, of slurry is caused to move, by the rotation of the vane 19, towards the discharge end of the shell 12 and additional slurry is added to this body by slurry entering from the pipe 33 and flowing past the longer horizontal edge 39. However, when the parts have rotated still further, returning to the position shown in FIG. 5, the slurry flowing in from the pipe 33 no longer is directed into the aforesaid body, or batch, of slurry in the shell, but is instead directed, due to the configuration of the delivery member 29, over the edges 41 and 42 to begin a new batch. Of course, there will be a short period of time, just before the parts have reached the position shown in FIG. 5, when the entering stream of slurry will fill that portion of the delivery member which extends between the edge 41 and the edge 39 and will flow over both of said edges. If desired there may be provided a plate (not shown) extending radially from the edge 41 to the inner wall of the shell 12, said plate being sealed, as by welding, to the end plate 13, the vane 19, the shell 12 and the edge 41 so as to prevent any of the slurry from entering into the narrow corner where the vane 19 meets the end plate 13.

As stated, the spaces between the convolutions of the vane 19 act as compartments for holding separate batches of the slurry. The cylindrical tube 26 of the core 21, which tube fits tightly against the arcuate plates 24 and also against the inner edges of the vane 19, serves to keep the slurry from flowing through the delivery member 29 to mingle with previously formed batches and also serves to prevent the slurry of one batch from flowing into another batch even when the level of the slurry in each batch extends almost to the top of said tube 26. The closed end 28 of the tube 26 serves to prevent the slurry from entering into, and accumulating in, the interior of said tube. Generally, the level of the batch of slurry in the compartment closest to the inlet end of the shell 12 is at or near the lower portion of the core 21. However, in subsequent compartments the level of the batches of slurry rises to almost the top of the core 21. This rise in the level of the slurry is effected by constructing the vane 19 so that its pitch decreases, to a constant value, over the first few compartments. Since a decrease in the pitch of the vane 19 means a decrease in the width of the spaces or compartments between successive convolutions of said vane, the level of the slurry in said spaces must rise if the volume of each batch of aerated slurry remains substantially constant during its travel through the shell 12. Generally speaking, however, the volume of each batch decreases somewhat, as the batch travels through the first few compartments, due to the loss of some of that portion of the air which is in the form of relatively large bubbles in the slurry. Accordingly, the change in the pitch of the vane 19 should be sufficient to compensate for such decreases in volume and to raise the level of the slurry as stated.

It will be seen that by providing a core 21 which is relatively large, it is permissible to raise the level of the slurry to a relatively high point without causing mixing of the batches of slurry. Accordingly, a shell 12 provided with a large core 21 has a greater capacity than the same shell would have if the core were relatively small. Desirably the diameter of the core is equal to about three tenths the inner diameter of the shell 12.

Although, as stated, the pitch of the vanes is such that the level of the slurry in the main portion of the shell 12 is desirably at or near the top of the core 21 when the apparatus is operating at its maximum capacity, the level of the slurry at the inlet end of the shell 12 should be at, or below, the lower portion of said core 21 in order to effect a relatively sharp division of the incoming slurry into a plurality of separate batches. Thus, if the level of the slurry in the compartment closest to the inlet end were above the lower portion of the core 21 portions of slurry could flow from the batch in said compartment into the succeeding batch through the slot 22. Accordingly, the pitch of the vane adjacent to the inlet end of the shell 12 is made greater than the pitch of the vane in the main portion of said shell.

In order to insure that the apparatus is operated properly there may be provided, if desired, suitable means for permitting observation of the levels of slurry in the shell 12. For example, there may be suitable sight-glasses or indicating devices (not shown) in the walls or end plates of the shell 12.

As the batches of aerated slurry move through the shell 12 they are subjected to mild agitation to maintain the fluidity and uniform consistency of the slurry and to effect some removal of excess entrained or emulsified air from the slurry. To this end there are provided a series of baffles 44, each having substantially the shape of a parallelogram, extending between adjacent convolutions of the vane 19. For convenience in identification, the first seven baffles 44, starting at the inlet end, are additionally designated successively by reference letters $a$, $b$, $c$, $d$, $e$, $f$ and $g$. As will be evident from FIG. 4, wherein the positions of these first seven baffles are shown, each baffle 44 extends, in a plane substantially tangent to the outer surface of the core 21, from the inner surface of the shell 12 to a point spaced from the outer surface of said core. In one suitable construction, the inner end of each baffle 44 is spaced radially from the outer surface of the core 21 a distance equal to about one half the radius of said core. The long sides of each baffle 44 are welded, or otherwise joined, to adjacent convolutions of the vane 19, while the outer end of each baffle may be similarly joined to the inner surface of the shell 12. The baffles 44 are spaced around the core 21 at suitable intervals, e.g. intervals of about 460°, to accomplish the desired mild agitation. Thus, in one embodiment there are about 1¼ convolutions of the vane 19 between successive baffles 44.

As the shell rotates in the direction indicated by the arrow in FIG. 4 each baffle 44 dips into a separate batch of the slurry and causes the slurry to flow through the space between the surface of the core 21 and the inner end of said baffle. Thus, when a baffle 44 has reached the position of baffle $g$ (to the left in FIG. 4) it is pressing down on a batch of slurry, causing the viscous slurry to flow between the baffle 44 and the core 21 and onto the upper surface of said baffle, while when a baffle reaches the position of baffle $e$ (to the right in FIG. 4) it is about at the point of leaving the surface of the batch of slurry and any slurry on said baffle drips off into the batch from which it came. Accordingly, it will be seen that the angular position of the baffles 44 is such that no intermingling of batches of slurry results from the action of said baffles.

When a baffle 44 reaches the position of baffle $e$ in FIG. 4 the space between the core 21 and the inner end of said baffle is still filled with a portion of the slurry, so that air is prevented from entering beneath the lower surface of said baffle. Because of this, the upward movement of the baffle exerts a suction effect on the slurry and causes a portion of the batch of slurry beneath the baffle to be trapped and raised above its normal level. When the space between the core 21 and the inner end of the baffle 44 is cleared of slurry, due to the further movement of the baffle, air rushes into the space beneath the baffle, and the trapped, raised portion of slurry falls suddenly. This effect may be overcome, if desired, by providing each baffle 44 with a relatively small opening 45 for the passage of air therethrough adjacent to the outer end of the baffle or by spacing the outer end of each baffle a relatively short distance from the inner surface of the shell 12.

The apparatus of this invention is so constructed that the slurry is discharged from the shell 12 gradually without intermingling of batches of slurry. The pitch of the vane 19, which pitch is constant over most of the length of the shell 12, increases at the discharge end, thus causing the level of the slurry in the shell to drop from a height near the top of the core 21 to a height about level with the bottom of said core, when the amount of slurry fed to the tank is equal to the maximum designed capacity of said tank. Of course, when the tank is operating below capacity the level of the slurry necessarily will drop below this height as it moves toward the discharge end. The space between the last half-convolution of the vane 19 and the end plate 14 of the shell 12 is sealed off from the rest of the tank by a flat lift plate 46 which extends from the core 21 to the inner surface of the shell 12. The lift plate 46 is joined, as by welding, to the vane 19, the end plate 14, the shell 12, and the discharge member 31, and serves to help direct the slurry through the discharge slot 23 defined by said discharge member.

The discharge member 31, which is preferably made of sheet metal, is illustrated in detail in FIGS. 6, 7, 10, 11 and 12. This discharge member 31 has several edges. Of these edges three are located entirely in vertical planes: a semicircular outer edge 47 extending over an arc of about 180°, which abuts against the end plate 14 around the outlet aperture 17 of said end plate; circular inner edge 48 which is welded or otherwise joined to the opposed arcuate plates 24 (see FIG. 6) and to the sealing plate 32; and an intermediate arcuate edge 49 having the same radius as the outer and inner edges 47 and 48 and extending over an arc of about 240°. A straight horizontal edge 51 extends from a corner 52 (FIG. 10) at an end of the intermediate edge 49 to a corner 53 at one end of the outer edge 47. A helical edge 54 extends, over an arc of about 60°, from a corner 56 at the other end of said outer edge 47, said helical edge 54 being connected to a relatively short straight horizontal edge 57 running from the other end 58 of the intermediate edge 49. The lift plate 46 is joined to the discharge member 31 along the longer horizontal edge 51, the length of said edge 51 being equal to one half of the pitch of the vane 19, while the vane 19 is joined to the discharge member 31 along the helical edge 54 and also along a helical line running from said edge 54, through the corner 52, all around the discharge member 31, as shown in FIG. 6. It will thus be seen that the discharge slot 23 of the core 21 is defined by the connected edges 51, 49, 57 and 54 and by the portion of the end plate 14 joining the corners 56 and 53.

As stated, one end of the vane 19 abuts against and is welded to the end plate 14 along a line extending radially on said end plate. The rotation of the tank 11 causes the batches of slurry to be brought successively into contact with the end plate 14, and, since the vane 19 is at an angle to the end plate 14, the width of each such successive batch will begin to decrease. More particualrly, this decrease in the width of the batch will commence when the upper surface of said batch first comes in contact with the end plate 14 along the radial meeting line of the vane 19 and said end plate, which meeting line has its inner end at the point 56 of the discharge member 31. The approximate position of the tank when this contact occurs is shown in FIG. 11. In this position the horizontal edge 57 of the discharge slot 23 is just above the upper surface of that batch of slurry which is closest to the outlet end of the tank 11. As the tank rotates in the direction shown by the arrows, i.e. past the position shown in FIG. 7, the width of this batch of slurry will be caused to decrease progressively, as explained above, so that the level of the slurry in said batch will tend to rise and the slurry will be discharged progressively through the discharge slot 23. Continued rotation of the tank, past position shown in FIG. 12, brings the forward surface of the lift plate 46 into contact with the slurry so that said lift plate pushes against said slurry and lifts its level, thus causing the slurry to continue to flow through the discharge slot 23, until, when the tank returns to approximately the position shown in FIG. 11, the last portions of the slurry of said batch have run off the forward surface of the lift plate 46 over the edge 51 and through the discharge slot 23 just before the discharge of the next batch has begun. The lift plate 46 thus functions to accomplish the discharge of each batch of slurry before the discharge of the succeeding batch begins. If desired, the construction may be varied to cause the lift plate 46 to effect a more rapid discharge of each batch of the slurry. For example, the lift plate 46 need not extend radially from the edge 51 but may extend along a portion of a chord so that when the tank approaches the position shown in FIG. 11 the lift plate will provide a steeper run-off surface for the last portions of slurry of any given batch.

The slurry leaving the shell 12 passes through a discharge nozzle 59 fixed, in any suitable manner, to the end plate 14 and then into a tapered sump tank 61 having an outlet pipe 62 at the bottom thereof. From the outlet pipe 62 the slurry preferably flows directly to a degasser (not shown) where the bubbles of gas are removed and the slurry is cooled by evaporation of a portion of its water. A suitable degasser is shown in the copending application of Bradshaw, James and Shaw, Serial No. 403,750, filed on even date herewith.

The apparatus of this invention is so constructed that there is easy access to the interior of the shell 12 in order to clean the same. Thus, in order to obtain access to the interior of the shell 12 it is sufficient merely to shift the pipe 33 away from the shell 12, remove the guard plate 34 which is bolted to the end plate 13, and remove the closed tube 26 which is provided with an eye bolt 63 to enable it to be drawn easily out of the shell. These operations provide a hollow space through the center of the shell 12. Preferably, the apparatus is of sufficient size so that a man can crawl into this hollow space and apply cleaning tools to the surface of the vane 19 and the inside of the shell 12. Also, the access to the interior provided by the use of the removable tube 26 makes it easier to assemble and erect the aging tank.

It is to be understood that the foregoing detailed description is given merely by way of illustration and that many variations may be made therein without departing from the spirit of our invention.

Having described our invention, what we desire to secure by Letters Patent is:

1. Process which comprises supplying to one end of a horizontal cylindrical vessel having a spiral vane rotating about a horizontal axis a continuous stream of a liquid reaction mixture which is a stable dispersion of small bubbles of an oxygen-containing gas in a slurry of alkali cellulose in aqueous alkali containing an emulsifying agent, dividing said continuous stream into a plurality of separate successive batches in said vessel and moving said reaction mixture along the length of said vessel by the rotation of said vane while maintaining said batches separate between convolutions of said vane while said mixture reacts.

2. Process of claim 1 in which said emulsifying agent is a sodium salt of sulfated oleic acid and the temperature of the reaction mixture is maintained at about 45° C. to 75° C. in said vessel.

3. In a treating apparatus, a vessel, means for supplying a continuous stream of a liquid to said vessel, and means for dividing said continuous stream into successive separate batches and for moving said batches in separated condition along the length of said vessel substantially without transfer of material from batch to batch, said means including a rotatable spiral vane mounted in said vessel, said vane having a plurality of convolutions for maintaining said batches separate and for moving said batches between said convolutions along the length of said vessel as said vane rotates, the construction and arrangement of said means being such as to substantially prevent the transfer of material between said batches as said batches are moved along said vessel.

4. In a treating apparatus, a horizontal cylindrical vessel rotatable about a horizontal axis and having an inlet means solely at one end for introducing all the material entering said vessel, outlet means solely at the other end of said vessel for discharging all the material leaving said vessel, means for supplying a continuous stream of liquid to the inlet end of said vessel and means for dividing said liquid into a plurality of separate batches and for moving said batches in separated condition along the length of said vessel substantially without transfer of material from batch to batch to the discharge end thereof, said means including a spiral vane in said vessel and connected thereto for rotation therewith, said vane having a plurality of convolutions for maintaining said batches separate and for moving said batches along the length of said vessel as said vane rotates.

5. In a treating apparatus, a horizontal cylindrical vessel rotatable about a horizontal axis and having an inlet at one end and an outlet at its other end, means for supplying a liquid to the inlet end of said vessel, means for dividing said liquid into a plurality of separate batches and for moving said batches in separated condition along the length of said vessel to the discharge end thereof, said means including a spiral vane in said vessel and connected thereto for rotation therewith, said vane having a plurality of convolutions for maintaining said batches separate and for moving said batches along the length of said vessel as said vane rotates, and a removable central cylinder about which said vane is disposed, said cylinder having imperforate walls bridging the spaces between adjacent convolutions of said vane.

6. In a treating apparatus, a horizontal cylindrical vessel rotatable about a horizontal axis and having an inlet at one end and an outlet at its other end, means for supplying a liquid to the inlet end of said vessel, means for dividing said liquid into a plurality of separate batches and for moving said batches in separated condition along the length of said vessel to the discharge end thereof, said means including a spiral vane in said vessel and connected thereto for rotation therewith, said vane having a plurality of convolutions for maintaining said batches separate and for moving said batches along the length of said vessel as said vane rotates, and a central core about which said vane is disposed, said core having imperforate walls bridging the spaces between adjacent convolutions of said vane.

7. Apparatus as set forth in claim 6 in which said core is mounted for movement with said vane and has a delivery slot adjacent the inlet end of said vessel for the passage of said stream into contact with said vane to form said batches.

8. Apparatus as set forth in claim 7 in which said core has a concave surface disposed, between convolutions of said vane, in the path of said stream and adjacent to said slot for deflecting said stream from one of said batches to the succeeding batch as said vessel rotates.

9. In a treating apparatus, a vessel having an inlet at one end and an outlet at its other end, means for supplying liquid to the inlet end of said vessel and means for dividing said liquid into a plurality of separate batches and for moving said batches in separated condition along the length of said vessel to the discharge end thereof, said means including a spiral vane mounted for rotation about a horizontal axis, said vane having a plurality of convolutions for maintaining said batches separate and for moving said batches along the length of said vessel as said vane rotates, said apparatus including means, mounted in said vessel for rotation with said vane, providing a surface in the path of said continuous stream for deflecting said stream from one of said batches to the succeeding batch as said vane rotates.

10. Apparatus as set out in claim 9, said apparatus having a central core about which said vane is disposed, the pitch of said vane being greater adjacent to said deflecting surface than in succeeding portions of said vane whereby the level of the liquid in said batches is raised as it is moved away from the inlet end of said vessel, said core having imperforate walls bridging the spaces between adjacent convolutions of said vane.

11. Apparatus as set forth in claim 9, said surface being disposed between convolutions of said vane.

12. In a treating apparatus, a vessel, means for supplying a continuous stream of a liquid to said vessel, and means for dividing said continuous stream into successive separate batches and for moving said batches in separated condition along the length of said vessel, said means including a rotatable spiral vane mounted in said vessel, said vane having a plurality of convolutions for maintaining said batches separate and for moving said batches along the length of said vessel as said vane rotates, a central cylinder about which said vane is disposed, said cylinder having imperforate walls bridging the spaces between adjacent convolutions of said vane, and a baffle mounted between convolutions of said vane for movement with said vane, said baffle being spaced from said cylinder to cause the liquid in said vessel to move between said cylinder and one end of said baffle on rotation of said vane so as to agitate each of said batches without causing intermingling of adjacent batches.

13. In a treating apparatus, a vessel, means for supplying a continuous stream of a liquid to said vessel, and means for dividing said continuous stream into successive separate batches and for moving said batches in separated condition along the length of said vessel, said means including a rotatable spiral vane mounted in said vessel, said vane having a plurality of convolutions for maintaining said batches separate and for moving said batches along the length of said vessel as said vane rotates, a central cylinder about which said vane is disposed, said cylinder having imperforate walls bridging the spaces between adjacent convolutions of said vane, a plurality of baffles mounted in spaced relationship around said vane and between convolutions of said vane for movement with said vane, each of said baffles being spaced from said cylinder to cause the liquid in said vessel to move between said cylinder and one end of each of said baffles on rotation of said vane so as to agitate each of said batches without causing intermingling of adjacent batches, said baffles having apertures for the passage of gas therethrough adjacent the inner walls of said vessel.

14. In a treating apparatus, a vessel, means for supplying a continuous stream of a liquid to one end of said vessel, and means for dividing said continuous stream into successive separate batches and for moving said batches in separated condition along the length of said vessel, said means including a rotatable spiral vane mounted in said vessel, said vane having a plurality of convolutions for maintaining said batches separate and for moving said batches along the length of said vessel as said vane rotates, and means for successively discharging said batches from said vessel at the end thereof opposite to the inlet end, the pitch of said vane being greater adjacent said ends than in the intermediate portions of said vessel.

15. In a treating apparatus, a horizontal cylindrical vessel rotatable about a horizontal axis and having an inlet at one end and an outlet at its other end, means for supplying a liquid to the inlet end of said vessel and means for dividing said liquid into a plurality of separate batches and for moving said batches in separated condition along the length of said vessel to the discharge end thereof, said means including a spiral vane in said vessel and connected thereto for rotation therewith, said vane having a plurality of convolutions for maintaining said batches separate and for moving said batches along the length of said vessel as said vane rotates, and a central core about which said vane is disposed and which is connected with said vane for rotation therewith, said core having imperforate walls bridging the spaces between adjacent convolutions, said core having a discharge slot, adjacent said outlet, for successively discharging said batches.

16. In a treating apparatus, a horizontal cylindrical vessel having an inlet at one end and an outlet at its other end, means for supplying a continuous stream of a liquid to said vessel, means for dividing said continuous stream into successive separate batches and for moving said batches in separated condition along the length of said vessel, said means including a spiral vane mounted in said vessel for rotation about the horizontal axis thereof, said vane having a plurality of convolutions for maintaining said batches separate and for moving said batches along the length of said vessel as said vane rotates, said outlet being above the bottom of said vessel, and there being a member mounted, adjacent to said outlet, for rotation with said vane, said member having a surface extending inwardly from the inner wall of said vessel for moving said batches upward and through said outlet.

17. Apparatus as set out in claim 6, said core being connected to said vane for rotation therewith, said core having a discharge slot, adjacent said outlet, for successively discharging said batches, the pitch of said vane being greater adjacent to the outlet end of said vessel than at a point intermediate said inlet and outlet ends whereby the level of said batches is lowered as said batches approach said discharge slot, and a member mounted for rotation with said vane and having a surface extending between said core and the inner wall of said vessel for moving said batches upward and through said discharge slot.

18. An apparatus for the aging of gasified slurry of alkali cellulose, said apparatus comprising a heat-insulated horizontal cylindrical vessel rotatable about a horizontal axis, said vessel having vertical end walls and a central inlet in one of its end walls and a central outlet in its opposite end wall, means for supplying a continuous stream of a heated slurry of alkali cellulose in aqueous alkali containing bubbles of an oxygen-containing gas stably dispersed therein to said inlet, and means for dividing said continuous stream into successive separate batches and for moving said batches in separated condition along the length of said vessel, said means including a spiral vane in said vessel connected thereto for rotation therewith, said vane making at least 10 convolutions in said vessel, a central core about which said vane is disposed and which is connected to said vane for rotation therewith, said core having imperforate walls bridging the spaces between adjacent convolutions of said vane and having a delivery slot adjacent said inlet for the passage of said stream into contact with said vane to form said batches, said core having a concave surface disposed, between the initial convolutions of said vane, in the path of said stream and adjacent to said slot for deflecting said stream from one of said batches to the succeeding batch as said vessel rotates, the pitch of said vane being greater adjacent to said deflecting surface than in succeeding portions of said vane whereby the level of the slurry in said batches is raised as it is moved away from the inlet end of said vessel, said core having a discharge slot adjacent to said outlet for successively discharging said batches, the pitch of said vane being greater adjacent to said slot than in preceding portions of said vane whereby the level of the slurry in said batches is lowered below said discharge slot as it is moved toward the outlet end of said vessel, said vane being at an angle to the end wall of said tank at said outlet whereby as each batch of slurry is brought into contact with said end wall the width of said batch is decreased and the level of the slurry in said batch is raised thus causing the slurry to be discharged through said discharge slot, and a member mounted for rotation with said vane and having a surface extending between said core and the inner wall of said vessel for moving the batch of slurry in contact with said outlet end wall upward and through said discharge slot before an appreciable amount of the succeeding batch of slurry is discharged through said discharge slot.

References Cited in the file of this patent

UNITED STATES PATENTS

| | | |
|---|---|---|
| 888,685 | Arnold | May 26, 1908 |
| 2,012,298 | Berge | Aug. 27, 1935 |
| 2,337,137 | Thompson et al. | Dec. 21, 1943 |
| 2,433,552 | Haney et al. | Dec. 30, 1947 |
| 2,542,492 | Entwistle et al. | Feb. 20, 1951 |
| 2,592,355 | Tachikawa | Apr. 8, 1952 |
| 2,647,114 | Torke et al. | July 28, 1953 |
| 2,680,738 | Laughlin | June 8, 1954 |